United States Patent [19]

Indekeu et al.

[11] Patent Number: 5,212,477
[45] Date of Patent: May 18, 1993

[54] METHOD FOR SIZING MESSAGE CHARACTERS FOR A DISPLAY

[75] Inventors: Jack P. Indekeu, Delray Beach; Joseph E. Laviana, Lake Worth; Carlos E. Marciales, Boynton Beach, all of Fla.

[73] Assignee: Motorola, Inc., Schaumburg, Ill.

[21] Appl. No.: 786,684

[22] Filed: Nov. 1, 1991

[51] Int. Cl.$^5$ .............................................. H04B 7/00
[52] U.S. Cl. ............................... 340/825.44; 340/731; 340/311.1
[58] Field of Search ...................... 340/311.1, 731, 735, 340/825.44, 825.47, 825.48

[56] References Cited

U.S. PATENT DOCUMENTS

| | | | |
|---|---|---|---|
| 4,896,147 | 1/1990 | Futakata | 340/731 |
| 5,075,799 | 12/1991 | Pine et al. | 340/825.44 |
| 5,107,259 | 4/1992 | Weitzen et al. | 340/731 |

OTHER PUBLICATIONS

S-MOS SYSTEMS, INC., product marketing literature, entitled "SED1520F, CMOS DOT MATRIX LCD Driver, (SED1520F, SED1521F)", pp. 17, 44, 48, and 49.
HITACHI, INC., product data book, entitled "HD66108T, (RAM-PROVIDED 165-CHANNEL LCD Driver LIQUID CRYSTAL DOT MATRIX GRAPHICS)", pp. 445, 450, and 451.

*Primary Examiner*—Donald J. Yusko
*Assistant Examiner*—Dervis Magistre
*Attorney, Agent, or Firm*—Jose Gutman; William E. Koch; Thomas G. Berry

[57] ABSTRACT

An electronic device (100) includes a memory (106) for storing a message, the message having message characters and a message length. The electronic device (100) automatically selects one of at least first and second sizes (301 and 311) for displaying the message characters by comparing the message length to at least one predetermined threshold, the message length being compared greater than each of the at least one predetermined threshold (402,404,406,414,416) indicating a different one of the at least first and second sizes (301 and 311), and each of the at least first and second sizes (301 and 311) corresponding to a different one of at least first and second number of lines (304,314) on a display screen. The electronic device (100) displays (408) at least a portion of the message characters in the selected size and in the corresponding one of at least first and second number of lines on the display screen.

19 Claims, 4 Drawing Sheets

METHOD FOR SIZING MESSAGE CHARACTERS FOR A DISPLAY

FIELD OF THE INVENTION

This invention relates generally to methods of controlling display devices, and more particularly to a method for sizing characters in a display.

BACKGROUND OF THE INVENTION

Many electronic devices, such as selective call receivers (e.g. pagers), communicate information to a user by displaying messages on a display. The display normally has fixed dimensions and is usually capable of displaying a maximum number of message characters. Typically, the number of message characters that can be displayed at one time is limited by the size of the message characters and the fixed dimensions of the display. These limitations are normally set in the design of the electronic device, and do not change during normal operation.

Regrettably, different segments of the user population for these electronic devices have different visual acuity, and may prefer different character sizes on the display. Some individuals are able to easily focus and read a message on the display at a normal viewing distance. While, other individuals are not able to focus and read the same message. Focusing distance also normally increases with age as a result of presbyopia. As the focusing distance increases the size of message characters must also increase to maintain the same subtended visual angle in relation to an image size on the retina. Often, the character size is too small for the user's normal viewing distance.

Optionally, the size of message characters could be set to a substantially large size on the display. This would help satisfy those segments of the user population that have difficulty reading the smaller size message characters. However, fewer of the larger sized characters could be displayed at one time. Hence, longer messages may have to be displayed in multiple display screens with many of the longer words partially displayed in two or more display screens. This procedure tends to be cumbersome and time consuming. Hence, certain segments of the user population are inconvenienced by having one fixed character size for the display.

Accordingly, there exists a need in the art for an improved method of displaying message characters on a display.

SUMMARY OF THE INVENTION

In carrying out one form of this invention, there is provided an electronic device for displaying a message on a display screen. The electronic device comprises storing means for storing a message, the message having message characters and a message length, and automatic selecting means, coupled to the storing means, for automatically selecting one of at least first and second sizes for displaying the message characters by comparing the message length to at least one predetermined threshold, the message length being compared greater than each of the at least one predetermined threshold indicating a different one of the at least first and second sizes, and each of the at least first and second sizes corresponding to a different one of at least first and second number of lines on a display screen. A display means is coupled to the automatic selecting means and the storing means for displaying on a display screen at least a portion of the message characters in the selected size and in the corresponding one of at least first and second number of lines on the display screen.

DESCRIPTION OF A PREFERRED EMBODIMENT

Figure 1:
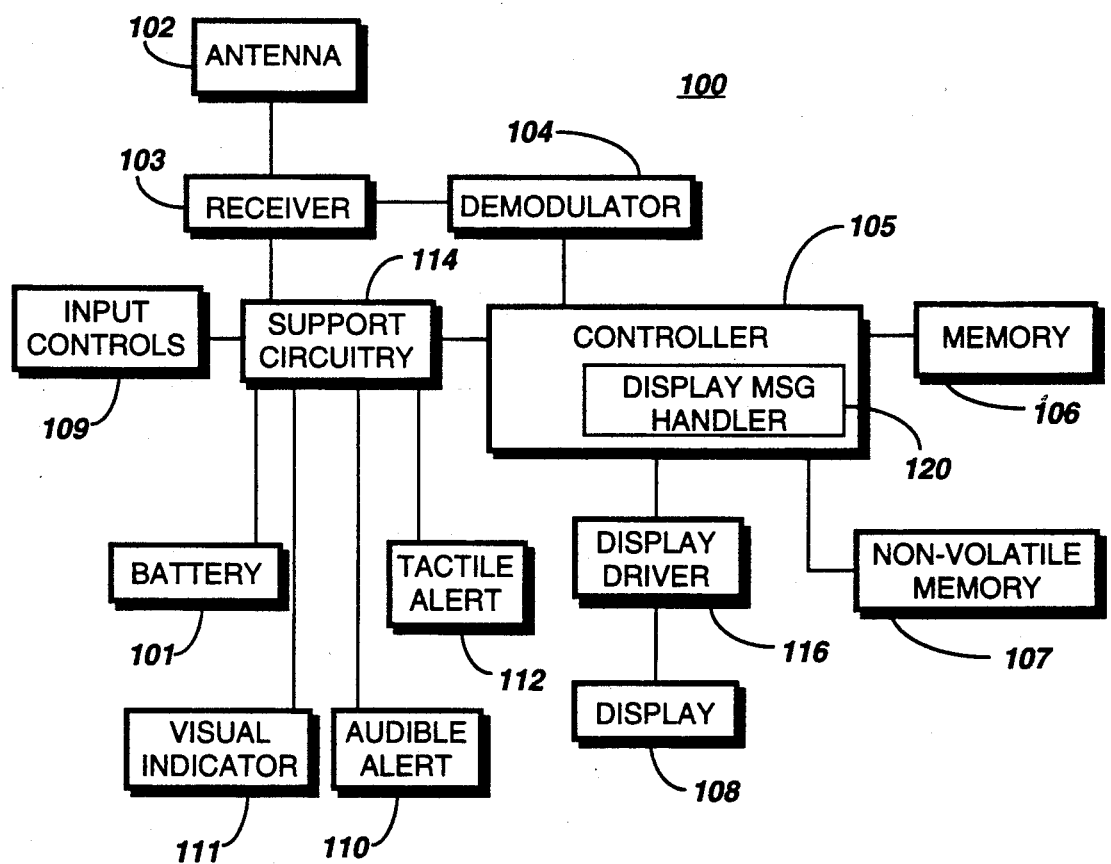
FIG. 1 is a block diagram of a selective call receiver.

Referring to FIG. 1, a block diagram of an electronic device, such as a selective call receiver (e.g., a paging receiver) 100 is shown. The selective call receiver 100 is powered by a battery 101 and operates to receive a radio frequency signal via an antenna 102. A receiver 103 is coupled to the antenna 102 to receive the radio frequency signal. The receiver 103 couples the radio frequency signal to a demodulator 104, which recovers any information signal present using conventional techniques. The recovered information signal from the demodulator 104 is coupled to a controller 105 which interprets and decodes the recovered information.

In the preferred embodiment, the controller 105 comprises a microcomputer, such as a Motorola, Inc. manufactured microcomputer (e.g., MC68HC05C4), and has a signal processor performing the function of a decoder, which is normally implemented in both hardware and software. The signal processor checks the recovered information signal for address information and correlates a recovered address with a predetermined address that is usually stored in the selective call receiver's non-volatile memory 107. When the address correlate, and in accordance with settings associated with user input controls 109, such as buttons or switches, the controller 105 normally stores a recovered message in a memory 106.

Subsequently, the selective call receiver 100 typically presents at least a portion of the received message to a user, such as by a display 108 (e.g., a liquid crystal display). In addition, typically an audible alert indicator device 110 (e.g., a speaker or a piezoelectric transducer), a visual alert indicator device 111 (e.g., a lamp, a light emitting diode, or an icon representation on the display 108), a vibratory alert indicator device (e.g., a tactile alerting device) 112, or a combination of the aforementioned alert indicator devices alerts the user that a message has been received. The user then can view at least a portion of the message presented on the display 108 by activating the user input controls 109.

Support circuitry 114 preferably comprises a conventional signal multiplexing integrated circuit, a voltage regulator and control mechanism, a current regulator and control mechanism, audio power amplifier circuitry, control interface circuitry, and display illumination circuitry. These elements are arranged to provide support for the functions of the selective call receiver 100 as may be requested by a user.

The display 108 preferably includes display driving and control circuitry 116 which controls certain functions of the display. For example, the display refresh cycles can be handled in a background mode by the driving and control circuitry 116. Also, this circuitry 116 handles the hardware level addressing and driving of pixels on the display 108. Hence, the controller 105, in the preferred embodiment, is free from having to perform these low level tasks. The controller 105 typically couples information to the display driving and control circuitry 116 for display on the display 108. This information may comprise bit patterns or character patterns to be displayed on the display 108. The display driving and control circuitry 116 then handles the low level tasks to display the characters on the display 108. A display 108 having associated driving and control circuitry 116 as described above, may be commercially available, such as the CMOS Dot Matrix LCD Driver model number SED1520F manufactured by S-MOS Systems, or the RAM-Provided 165-Channel LCD Driver for Liquid-Crystal Dot Matrix Graphics model number HD66108T manufactured by HITACHI,Inc.

The controller 105 comprises a display message handler 120 implemented in hardware and software. The display message handler 120 handles the medium to high level functions necessary for displaying a message on the display 108. These functions can include formatting the message and sizing the message characters to be displayed on each display screen. For example, one typical message formatting function may determine when a word in the message lands on a screen boundary. That is, a word partially displays on a first screen and on a second screen. In such a determination, the handler 120 can format the message to display the complete word on the second display screen, filling the first display screen with blank spaces as necessary. This formatting of course is only possible where the word length is less than a full display screen, which is normally the case. Hence, in this way, a user can read a display message typically having words completely displayed on a display screen.

The message character sizing function provides a method for maintaining character sizes at an optimal size for the user. Preferably, the message characters are sized to fill a current display screen with the largest possible character size. In one aspect of the present invention, the display message handler 120 determines the character size to use for the current display screen based on the length of the remaining message to be display and the available character sizes. This method for sizing message characters will be more fully discussed below. In this way, a user can read the current display screen having the message characters as large as possible.

Figure 2:
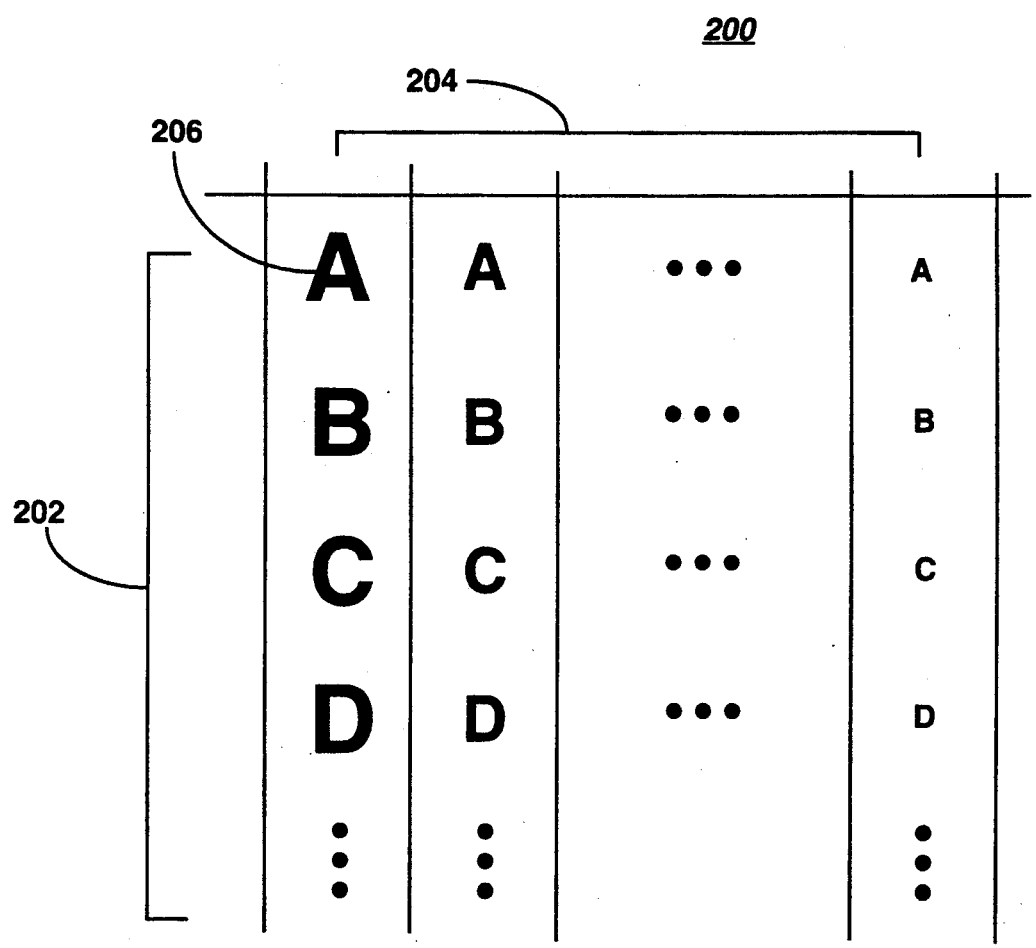
FIG. 2 illustrates a data structure in memory for storing character patterns.

FIG. 2 shows an exemplary data structure 200, e.g., a table, comprising character representations 202. Each character representation 206 comprises a plurality of character patterns 204, representing the available character sizes for a particular character that the controller 105 may couple to the display 108. Specifically, each row represents a different character and each column represents a different character size for the particular character of that row. For example, a selective call receiver capable of displaying one hundred different message characters 202 in up to three different character sizes 204 would have three hundred different character patterns stored in a table 200 in memory. The character patterns would be arranged in one hundred rows 202 representing the characters by three columns 204 representing the character sizes. Preferably, the table 200 is stored in the selective call receiver's non-volatile memory 107. With such a data structure 200 in memory 107, the display message handler 120 can select a size for a character 206 to be displayed in the message character sizing function, as will be more fully discussed below.

Figure 3A:
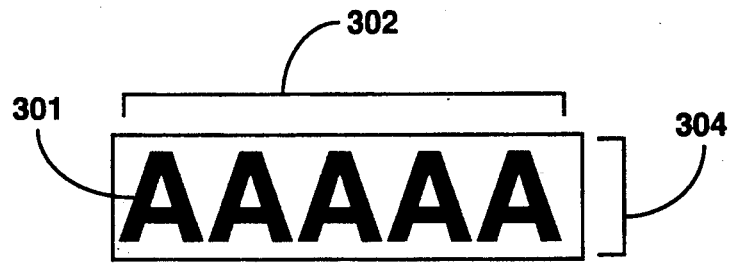
FIGS. 3A, 3B, and 3C are representations of a display having characters displayed in a first, second, and third size, respectively.
Figure 3B:
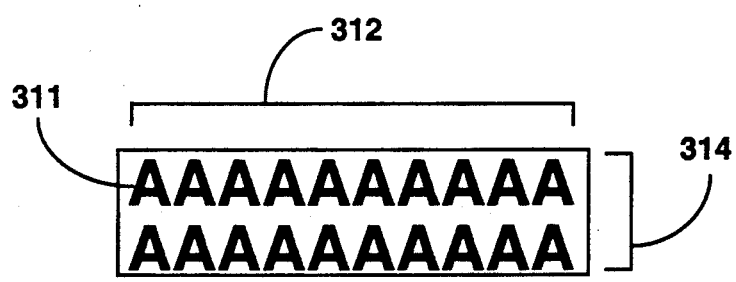
Figure 3C:
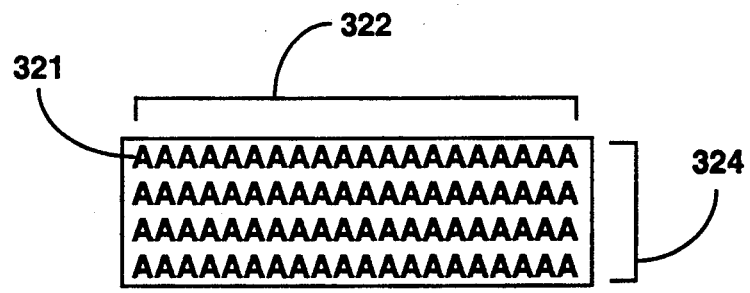

For example, FIGS. 3A, 3B, and 3C illustrate the display 108 having characters displayed in three different sizes, respectively. FIG. 3A shows a large character size 301 being displayed, where five message characters 302 can be displayed on one line 304 of the display 108. FIG. 3B shows a medium character size 311 being displayed, where ten message characters 312 can be displayed per line, with two lines 314 capable of being displayed. Lastly, FIG. 3C shows a small character size 321 being displayed, where twenty message characters 322 can be displayed per line, with four lines 324 capable of being displayed. In this example, up to five message characters can be displayed in one display screen at the large character size 301, up to 20 message characters can be displayed at the medium character size 311, and up to 80 message characters can be displayed at the small character size 321.

In one embodiment of the present invention, messages can be displayed using different character sizes, 301, 311, or 321, according to the length of the message. A short message such as "FIRE" can be displayed at the largest character size 301. However, longer messages having greater than five message characters may at least partially display at the smaller character sizes. The size of the message characters being displayed can be determined from the length of the remaining message, the available character sizes, and a predetermined minimum character size acceptable to a user.

Preferably, the user of the selective call receiver 100 can designate in the selective call receiver 100 the smallest character size which is still within the individual's normal viewing distance. That is, the user can configure the minimum acceptable character size for the display, such as small, medium, or large. This configuration procedure may be performed by prompting the user via the display 108 upon initially turning on the selective call receiver. The user can then select a character size via the user input controls 109, i.e., by entering user input. In this way, a user that is only comfortable reading messages at large or medium character sizes will not be presented with a message displayed at the small character size.

The messages having greater than five characters may be displayed at the small or medium size. The display message handler 120 determines the character size to use for the current display screen based on the length of the remaining message to be displayed and the available character sizes. Likewise, the user can predetermine a minimum character size for display. For example, a user may select the medium character size as the minimum acceptable size for displaying characters. A message having five characters or less will be displayed at the large character size in one display screen. A message having from six to twenty message characters will be displayed in the medium character size on one display screen. However, a message having a length of more than twenty message characters will have to be displayed on more than one display screen, the first twenty characters being displayed on the first screen and the remaining message being displayed on at least one subsequent screen.

In the latter case, where the remaining message length is five characters or less, the remaining message may be displayed at either the medium or the large character size. In the first case, the remaining characters display at the medium character size on the next display screen. This has the advantage that a user reading the first twenty message characters on the first display screen then reads the subsequent message characters on the second display screen at the same character size. The user conveniently maintains the same focus. In the second case, the remaining characters display at the large character size on the next display screen. This may be useful for individuals that prefer the large character size but are able to tolerate the medium character size with some discomfort. In this way, at least parts of the message can be read at the character size that is more comfortable for the particular user.

Figure 4:
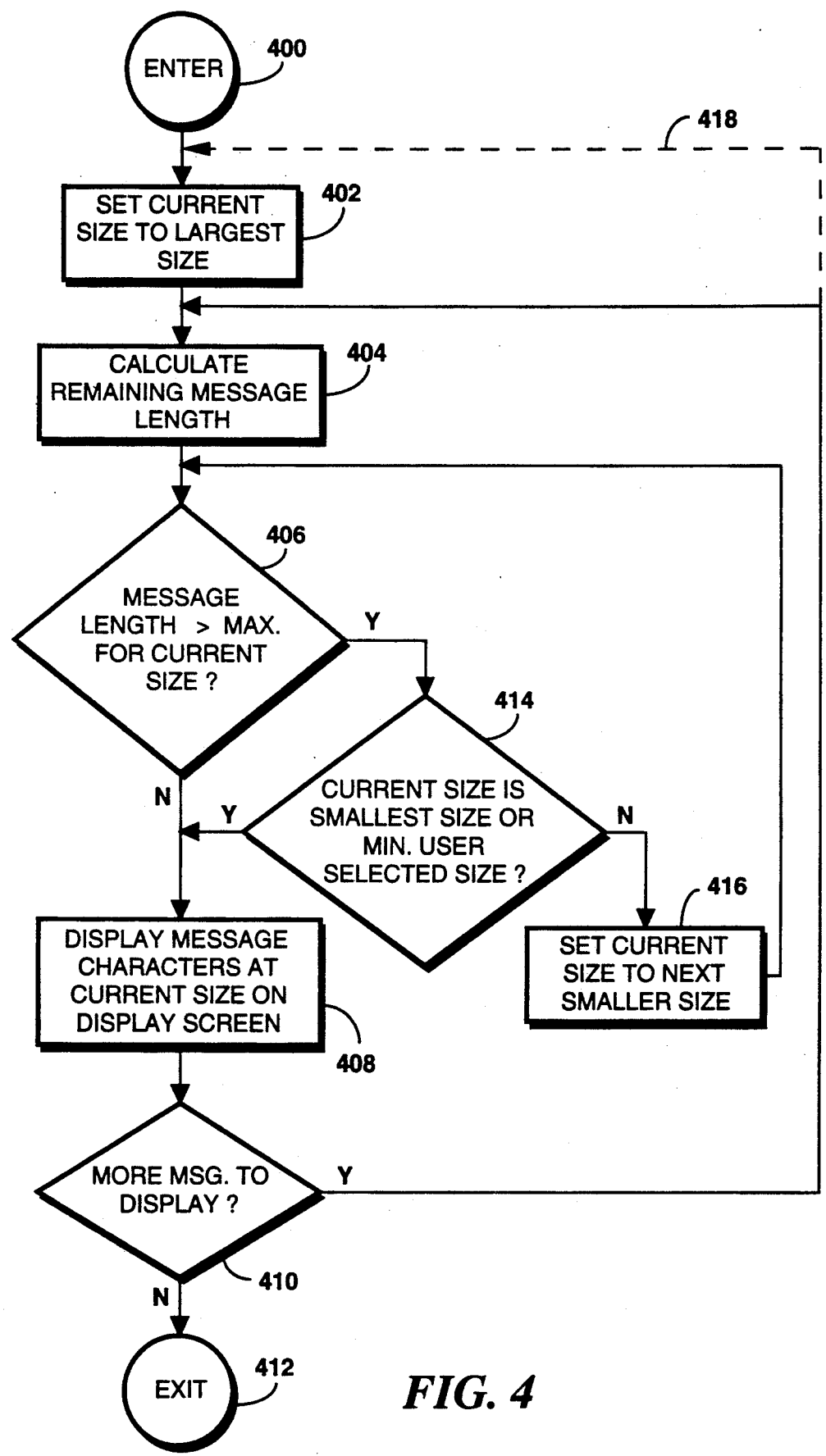
FIG. 4 is a flow diagram for the selective call receiver of FIG.1, in accordance with an embodiment of the present invention.

Referring to FIG. 4, a flow diagram for operation of the controller 105 of the selective call receiver 100 according to an embodiment of the present invention is shown. The selective call receiver 100 can display message characters in one of three different sizes, similar to the example illustrated in FIGS. 3A, 3B, and 3C. Hence, received paging messages having up to five message characters can be displayed at the large character size 301 on one display screen. In similar fashion, messages having message lengths of up to 20 characters may be displayed at the medium character size 311 on one display screen, and messages having message lengths up to 80 characters may be displayed at the small character size on one display screen. Also, messages having more than 80 characters in length will fill multiple screens of the display. In this embodiment, the remaining message characters may be displayed at any one of the three available character sizes (301, 311, and 321) on the at least one subsequent display screen. That is, the remaining message length can determine the size of the characters displayed on the display screen.

By displaying message characters in different sizes, based at least partly on the length of the message, a user reads each message in the largest possible character size available. Most of the time, this method can significantly enhance the readability of the display 108 for the majority of users.

Additionally, in this embodiment, the user of the selective call receiver 100 can designate in the selective call receiver 100 the smallest character size which is still within the individual's normal viewing distance. That is, the user can configure the minimum acceptable character size for the display, such as small, medium, or large. The user selection of the minimum acceptable character size preferably occurs upon initially turning on the selective call receiver, as discussed earlier. Preferably, the user selected minimum character size is stored in the selective call receiver's non-volatile memory 107. Then, the display message handler 120 can reference this character size limit in determining the smallest character size for displaying the message characters, as will be more fully discussed below.

In this way, the user can configure and limit the minimum size of the message characters displayed. This further enhances the readability of messages for those users that require larger character sizes and are willing to scroll through more display screens. Of course, those users that are comfortable with the smallest character size are not inconvenienced by having to scroll through multiple display screens at the larger character sizes. Therefore, this approach of sizing message characters and allowing users to limit the minimum character size for display can benefit most segments of the user population.

Referring again to FIG. 4, upon an event requesting that a message be displayed by the selective call receiver 100, such as a message being received or a user entering a user input via the user input controls 109, the controller 105 invokes the display message handler 120 to display a message. The message characters typically are stored in memory 106 and are available to the display message handler 120 to be displayed. The display message handler 120 performs the message character sizing function 400 as part of displaying the message as follows.

First, the display message handler 120 sets the current character size of the message to be displayed to large 402. The large sized message characters would be the easiest for a user to read. However, the user may have to scroll through multiple display screens to completely read the message. Hence, the display message handler 120 subsequently determines whether a smaller character size will be used to display the message.

Then, the message handler 120 calculates the length of the message 404 stored in memory 106 to determine whether a smaller character size will be displayed. The the loop 406, 414, and 416 handles the selection of the smallest character size to be displayed, where the current size to be displayed is selected based on the message length. In the example above, a message length of 5 characters or less can be displayed at the large character size 406, 408, 410, and 412. However, a message length that is greater than five characters will normally test the next smaller character size 406, 414, and 416. However, if the current size is the smallest size available or the minimum acceptable size for the user 414, then the message characters display at current size on the display screen 408.

In this embodiment of the present invention, the user may have previously configured a minimum acceptable character size for display, as discussed earlier. Hence, the character size will not be reduced beyond the user's minimum acceptable level. For example, the user may configure the selective call receiver 100 to display messages no smaller than the medium character size. Hence, the loop 406, 414, and 416 will stop at the medium character size, even if the message length is greater than 20. Similarly, an individual may set the smallest size that can be displayed to large. In this case, all messages are displayed at the large character size, regardless of the message length.

After displaying the current display screen 408, the display message handler 120 determines whether there are more message characters to display 410. That is, after each display screen fills with the message characters for the current size, the message handler 120 resizes any remaining message characters for display on a subsequent display screen 410, 404, 406. For example, a twenty four character message where the user's minimum acceptable character size is medium would display as follows. First, twenty message characters would display on the first display screen at the medium character size. Then, the remaining four message characters would display on a second display screen also at the medium character size.

In an alternative method of displaying characters, the display message handler 120 would display the aforementioned remaining four message characters at the large character size. As discussed earlier, this approach may be useful to some segments of the user population that prefer the large character size but are able to tolerate the medium character size with some discomfort. Therefore, for every subsequent display screen the remaining message characters are re-sized starting with the large character size. That is, in this alternative, after determining that there is more message to display 410 the display message handler 120 sets the current size to large 402 (as indicated by the dashed arrow 418) and then determines what the smallest character size to display the remaining message characters, as discussed above 404, 406, 414, 416.

In this automatic method of selecting the character size to be displayed, those segments of the user population which require larger character sizes will be satisfied. Likewise, other segments of the user population that are capable of reading messages at the smaller character sizes will have that option. Furthermore, shorter messages will be displayed on one screen at the larger character size, when possible. By keeping important messages to a short length, the size of the message characters on the display 108 also serve to indicate the importance of the message. For example, the message "FIRE" would be displayed in the large character size, designating its appropriate importance.

Thus, an improved method of displaying message characters on a display 108 is provided.

What is claimed is:

1. An electronic device, comprising:
   storing means for storing a message, the message having message characters and a message length;
   automatic selecting means, coupled to the storing means, for automatically selecting one of at least first and second sizes for displaying the message characters by comparing the message length to at least one predetermined threshold, the message length being compared as greater than each of the at least one predetermined threshold to indicate a different one of the at least first and second sizes, and each of the at least first and second sizes corresponding to a different one of at least first and second number of lines on a display screen; and
   display means, coupled to the automatic selecting means and the storing means for displaying on a display screen at least a portion of the message characters in the selected size and in the corresponding one of at least first and second number of lines on the display screen.

2. The electronic device of claim 1, further comprising paging receiving means coupled to the storing means for receiving a paging message and storing the paging message in the storing means.

3. The electronic device of claim 1, further comprising character memory means coupled to the display means for storing a collection of character representations, each character representation comprising a plurality of character patterns corresponding to the at least first and second sizes, the display means providing the character patterns corresponding to the selected size of the message characters to the display screen.

4. The electronic device of claim 1, wherein the greatest of the at least one predetermined threshold indicates the longest message that can be displayed on one display screen, and wherein the automatic selecting means when comparing the message length as greater than the greatest of the at least one predetermined threshold selects a size indicated by the greatest of the at least one predetermined threshold and the display means displays on a display screen the portion of the message characters that can be displayed on the display screen in the selected size and corresponding number of lines, a remaining portion of the message characters being displayable in at least one subsequent display screen.

5. The electronic device of claim 1, further comprising configurable size limiting means coupled to the automatic selecting means, the configurable size limiting means capable of being configured by a user of the electronic device for limiting the minimum displayable message character size that is selected by the automatic selecting means.

6. A selective call receiver, comprising:
   a display for displaying characters in one of at least first and second sizes;
   paging receiving means for receiving a paging message, the paging message having message characters and a message length;
   automatic selecting means, coupled to the paging receiving means, for automatically selecting one of at least first and second sizes for displaying the message characters by comparing the message length of the received paging message to at least one predetermined threshold; and
   display handling means, coupled to the automatic selecting means, the paging receiving means, and to the display, for displaying at least a portion of the message characters in the selected size.

7. The selective call receiver of claim 6, further comprising user input control means coupled to the display handling means for displaying at least a portion of the message characters in the selected size in response to user input.

8. The selective call receiver of claim 6, further comprising character memory means coupled to the display handling means for storing a collection of character representations, each character representation comprising a plurality of character patterns corresponding to the at least first and second sizes, the display handling means providing the display with the character patterns corresponding to the selected size of the message characters.

9. The selective call receiver of claim 6, wherein the greatest of the at least one predetermined threshold indicates the longest message that can be displayed on one display screen, and wherein the automatic selecting means when comparing the message length as greater than the greatest of the at least one predetermined threshold selects a size indicated by the greatest of the at least one predetermined threshold and the display handling means displays on a display screen the portion of the message characters that can be displayed on the display screen in the selected size, a remaining portion of the message characters being displayable in at least one subsequent display screen.

10. The selective call receiver of claim 6, further comprising configurable size limiting means coupled to the automatic selecting means, the configurable size limiting means capable of being configured by a user of the electronic device for limiting the minimum character size that is selected by the automatic selecting means.

11. The selective call receiver of claim 10, further comprising user input control means coupled to the configurable size limiting means for configuring the size limiting means in response to user input.

12. A method for an electronic device comprising the steps of:

storing a message, the message having message characters and a message length;

automatically selecting one of at least first and second sizes for displaying the message characters by comparing the message length of the message to at least one predetermined threshold, the message length being compared as greater than each of the at least one predetermined threshold to indicate a different one of the at least first and second sizes, and each of the at least first and second sizes corresponding to a different one of at least first and second number of lines on a display screen; and displaying the message characters in the selected size and in the corresponding one of at least first and second number of lines on the display screen.

13. The method of claim 12, further comprising the step prior to the storing step of receiving the message.

14. The method of claim 12, further comprising the steps of:

accepting user input configuration indicating the minimum acceptable size for displaying the message characters on a display screen; and limiting the minimum size that can be automatically selected from the at least first and second sizes for displaying the message characters on a display screen according to the user input configuration.

15. A method for displaying information in a plurality of character sizes, comprising the steps of:

calculating the number of characters in an information;

selecting one of a plurality of character sizes by comparing the number of message characters in the information to at least one predetermined threshold, the number of message characters being compared as greater than each of the at least one predetermined threshold to indicate a different one of the plurality of character sizes, and each of the plurality of character sizes corresponding to a different one of a plurality of number of lines values on a display screen; and displaying at least a portion of the information in the character size selected and in the corresponding one of the plurality of number of lines on the display screen.

16. The method of claim 15, further comprising the steps of:

accepting user input configuration indicating the minimum acceptable character size for displaying the at least a portion of the information on a display screen; and limiting the minimum character size that can be selected from the plurality of character sizes for displaying the at least a portion of the information according to the user input configuration.

17. The method of claim 15, wherein the displaying step displays a portion of the information on a display screen in the character size selected, and the method further comprising the steps of:

calculating the number of characters in a remaining portion of the information;

selecting one of the plurality of character sizes by comparing the number of message characters in the remaining portion of the information to at least one predetermined threshold, the number of message characters being compared as greater than each of the at least one predetermined threshold to indicate a different one of the plurality of character sizes, and each of the plurality of character sizes corresponding to a different one of a plurality of number of lines values on a display screen; and displaying the remaining portion of the information in the character size selected and in the corresponding one of the plurality of number of lines on the display screen.

18. The method of claim 17, further comprising the steps of:

accepting user input configuration indicating the minimum acceptable character size for displaying the information on a display screen; and limiting the minimum character size that can be selected from the plurality of character sizes for displaying the information according to the user input configuration.

19. A selective call receiver, comprising:

paging receiving means for receiving a paging message, the paging message having message characters and a message length;

storing means coupled to the paging receiving means for storing the paging message;

automatic selecting means coupled to the storing means for automatically selecting one of at least first and second sizes for displaying the message characters by comparing the message length of the received paging message to at least one predetermined threshold;

user input control means for receiving user input;

configurable size limiting means coupled to the user input means and the automatic selecting means, the configurable size limiting means capable of being configured by user input from a user of the electronic device for limiting the minimum character size that can be selected by the automatic selecting means; and display means, coupled to the automatic selecting means and the storing means for displaying on a display screen at least a portion of the message characters in the selected size.

* * * * *